Sept. 22, 1936.  R. B. MacMULLIN  2,055,084

PROCESS AND APPARATUS FOR CONVERTING A BICARBONATE INTO A CARBONATE

Filed Dec. 1, 1933

INVENTOR
Robert B. MacMullin
BY
Pennie Davis Marvin Edmonds
ATTORNEYS

Patented Sept. 22, 1936

2,055,084

UNITED STATES PATENT OFFICE 2,055,084

PROCESS AND APPARATUS FOR CONVERTING A BICARBONATE INTO A CARBONATE

Robert B. MacMullin, Niagara Falls, N. Y., assignor to The Mathieson Alkali Works, Inc., New York, N. Y., a corporation of Virginia Application December 1, 1933, Serial No. 700,540

7 Claims. (Cl. 23—63)

This invention relates to the conversion by calcination of bicarbonates into carbonates and is concerned more particularly with the production of sodium carbonate or soda ash from sodium bicarbonate produced by the ammonia-soda process. The invention is based on the principle of drying wet bicarbonate and then decomposing it while it is in suspension in a current of gas and comprehends both a method and apparatus by which the bicarbonate can be treated in the manner described rapidly and at low cost.

In the production of soda ash by the ammonia-soda process, bicarbonate of soda is precipitated from an ammoniacal brine, removed from the mother liquor by filtration, and then dried and decomposed by the application of heat. Heretofore the apparatus employed for the drying and decomposition has taken the form either of an externally heated rotary cylinder through which the material progresses or of a stationary pan externally heated and provided with agitating means so that the bicarbonate is kept in motion so as to be subjected to uniform heat conditions.

Both these forms of apparatus are open to serious objections in that the capital cost of the equipment is high per ton of output. The operating charges are also high because the apparatus includes ponderous moving parts operating at a high temperature so that repairs are frequently required and are of an expensive nature, and the thermal efficiency is low.

To avoid these objectionable features which are inherent in the apparatus now commonly employed for the purpose, I have devised a new method and apparatus for the drying and decomposition of the bicarbonate by which the material is treated while suspended in a rapidly flowing gas stream. This method can be practiced by apparatus which is simple and inexpensive to install, operate, and maintain and which has few moving parts so that power costs are low. In addition, the new apparatus makes it possible to obtain a high thermal efficiency since the heating surface can be so disposed as to reduce radiation and other losses.

The principles of the invention involve introducing the wet bicarbonate into a stream of hot gas to be carried along therein in suspension and subjecting the material, while it is in suspension, to temperatures sufficient to dry it and then decompose it. These principles can be advantageously utilized in various ways, as, for example, the wet bicarbonate may be fed into a stream of hot gas, dried during a part of its travel while suspended in the gas, and then passed with the gas stream through a heater wherein the gas and the material are subjected to a temperature sufficient to effect decomposition of the material. The carbonate thus produced is then separated from the gas and the latter reheated and returned to the point where the wet material is introduced into it.

In the complete method described, the gas which circulates contains a relatively large amount of carbon dioxide and as this constituent is evolved during decomposition, a portion of the gas stream is continually withdrawn from circulation so that the carbon dioxide can be recovered. It is possible, however, to dry the bicarbonate in air with little loss of carbon dioxide and the contained ammonia and, therefore, for some purposes, it may be desirable to dry the material in a current of air or in any other suitable manner, as by spray drying, and then effect decomposition of the dry material in a circulating stream of gas containing carbon dioxide as a constituent. This method of decomposition represents only a partial application of the principles of the invention but may be utilized to advantage under special local conditions.

For a better understanding of the invention, reference may be had to the accompanying drawing, in which Figure 1 is a diagrammatic view of one form of apparatus for practicing the complete method;

Figure 1:
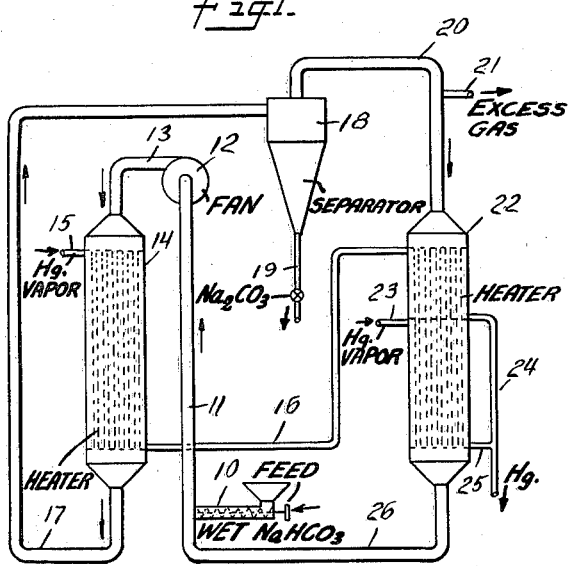

According to the method practiced by the apparatus shown in Figure 1, the wet bicarbonate is introduced by a suitable feeding mechanism 10, such as a ribbon screw feeder, into a conduit 11 extending vertically and leading to the intake of a fan 12. A discharge line 13 leads from this fan to a heater 14 in which the gas and suspended material are subjected to a decomposing temperature.

The heater illustrated may be of any suitable type and may be externally fired or heated by steam, mercury vapor, diphenyl, diphenyl oxide, or similar heating media. In the construction shown, the heater is of the mercury vapor type and the heating medium flows through the heater parallel to the direction of flow of gas. Mercury vapor is supplied to the heater through a pipe 15 and the liquid mercury is carried off through a pipe 16.

A conduit 17 from the heater conducts the gas with the material suspended in it to a separator 18 and the solid material is discharged from the separator through the pipe 19, while the gas is led off through the conduit 20 provided with a branch 21 through which a part of the stream may be withdrawn. The gas then passes to a heater 22, the upper section of which receives liquid mercury through the pipe 16, while the lower section is supplied with mercury vapor through the pipe 23. The liquid mercury from the upper section is discharged through the pipe 24 and that from the lower section is discharged through the pipe 25, which connects with the pipe 24. The hot gas leaving the heater passes through a conduit 26 which leads to the conduit 11, and in the heater, this gas is raised to a temperature such that the wet material is thoroughly dried in the conduit 11 before it enters the heater 14.

Figure 2:
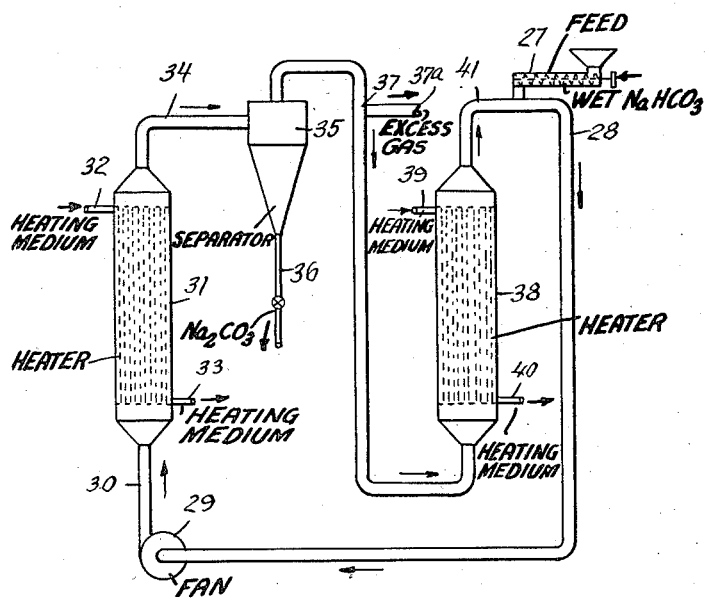
Figure 2 is a similar view of a modified form of apparatus.

When it is desired to use mercury vapor heaters and to have a countercurrent flow of the heating medium in the heaters, rather than the parallel flow, which occurs in the apparatus shown in Figure 1, that apparatus may be used in modified form, as shown in Figure 2. In the latter apparatus, the wet material is fed by a feeder 27 into a conduit 28 through which a stream of hot gas flows and in its travel in suspension in the gas, the suspended material is dried. The conduit 28 leads to the intake of a fan 29 from which there is a conduit 30 leading to a heater 31. This heater is supplied with heating medium through the pipe 32 and the medium is led off through the pipe 33.

In the heater, the gas and dry suspended material are subjected to a temperature sufficient for decomposition and the gas stream with the material in it passes from the heater through a conduit 34 to a separator 35 from which the separated carbonate is discharged through a line 36. The gas passes from the separator into a conduit 37 leading to a heater 38 which is supplied with heating medium through a pipe 39, the medium passing off through a pipe 40. Conduit 37 is provided with a handle 37a through which a portion of the gas may be withdrawn. In the heater, the gas is raised to a temperature sufficient to dry the wet material and the hot gas flows out through a conduit 41 which leads to the conduit 28.

When flue gas is used as the heating medium, it will be admitted to each heater at the bottom thereof and discharged at the top. Thus, when the apparatus shown in Figure 1 is employed with flue gas, the heating medium travels countercurrent to the gas to be heated while in the Figure 2 apparatus, the flow is parallel.

As previously mentioned, the wet bicarbonate can be air-dried with little loss of carbon dioxide and of the contained ammonia and the ammonia can be easily recovered. Accordingly, in some instances, it may be desirable to decompose the carbonate in apparatus different from that used for drying it. Such apparatus is illustrated in Figures 3 and 4.

Figure 3:
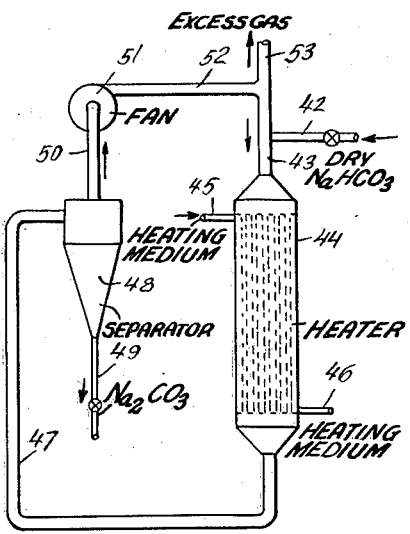
Figures 3 and 4 are diagrammatic views showing different forms of apparatus for effecting decomposition only of the material.
Figure 4:
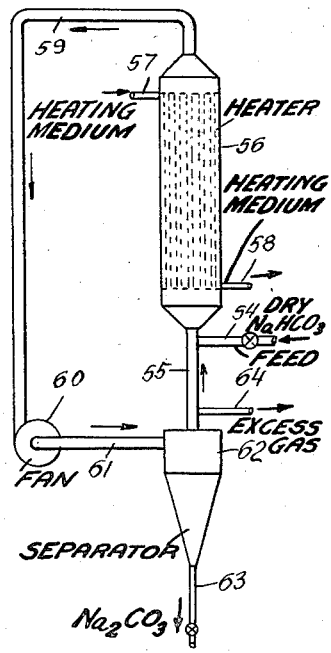

The Figure 3 apparatus is employed where mercury vapor or the like is used as a heating medium and the flow in the heater is parallel. In this apparatus, the dry bicarbonate is introduced by a feeder 42 into a conduit 43 which leads to the heater 44 having an intake 45 and an outlet pipe 46 for the heating medium. The gas and suspended material are heated in the heater to decomposing temperature and the stream of gas and material passes out from the heater through a conduit 47 to separator 48 from which the carbonate is discharged through a line 49. The gas leaves the separator through a conduit 50 which leads to the intake of a fan 51 and the gas passes from the fan through a conduit 52 which communicates with conduit 43. A branch line 53 permits the withdrawal of a portion of the circulating stream.

Where countercurrent flow of a heating medium, such as mercury vapor, is desired in the heater, the apparatus shown in Figure 4 may be used. In this apparatus, the dry bicarbonate is introduced by a feeder 54 into a conduit 55 leading to a heater 56 having an inlet pipe 57 and an outlet pipe 58 for the heating medium. A conduit 59 leads from the heater to a fan 60 which is connected by a conduit 61 to a separator 62 from which the solid material is discharged through pipe 63, while the gas is carried off through the conduit 55. The conduit 55 is provided with a branch 64 through which a portion of the gas stream can be withdrawn.

In the forms of the apparatus shown in Figures 1 and 2, the gas stream into which the wet material is discharged is in such volume and at such temperature that thorough drying of the bicarbonate occurs before the material reaches the heater where the temperature is raised to a point sufficient to effect decomposition. Preferably, the decomposition takes place in the heater and the material is thus completely decomposed by the time it reaches the separator. The temperature of decomposition of sodium bicarbonate is approximately 480° F. and, accordingly, no difficulty is encountered in effecting decomposition of the material as it is carried along in suspension.

In the heaters employed, different heating media may be used and the construction of the heaters will depend to some extent on the medium used and also on other factors. For example, with flue gas as the heating medium, the surfaces through which the heat is transferred to the circulating stream of gas may be chrome iron and it has been found that the dry bicarbonate does not stick to the metal. With other heating media, this and other materials may be used in accordance with standard practice to obtain the best results.

What I claim:

1. A method of converting a bicarbonate into a carbonate which comprises introducing the bicarbonate while wet into a stream of inert hot gas in which it is carried along in suspension and dried during its movement, and passing the stream with the bicarbonate suspended therein through a heater in which the temperature of the stream and bicarbonate is raised sufficiently to effect decomposition of the bicarbonate.

2. A method of converting a bicarbonate into a carbonate which comprises drying the bicarbonate, carrying the dry bicarbonate in suspension in a stream of inert gas, heating the gas and suspended bicarbonate to a temperature sufficient to decompose the bicarbonate and convert it into the carbonate, separating the carbonate from the stream, withdrawing a portion of said stream, and heating and recirculating the remainder.

3. A method of converting a bicarbonate into a carbonate which comprises maintaining a circulating stream of inert gas, heating the gas at one point in its path of travel, introducing the bicarbonate in wet condition into the gas in which it is carried in suspension and dried, heating the stream with the bicarbonate suspended therein to a temperature sufficient to effect decomposition of the bicarbonate into the carbonate, separating the carbonate from the stream, withdrawing a portion of the stream, and circulating the remainder.

4. A method of converting a bicarbonate into a carbonate which comprises introducing the bicarbonate into a stream of inert gas in which it is carried along in suspension, and raising the temperature of the gas and suspended bicarbonate sufficiently to effect decomposition of the bicarbonate.

5. A method of converting a bicarbonate into a carbonate which comprises introducing the bicarbonate into a stream of inert gas in which it is carried along in suspension, raising the temperature of the gas and suspended bicarbonate simultaneously and sufficiently to effect decomposition of the bicarbonate into the carbonate, separating the carbonate from the gas, and circulating the gas.

6. Apparatus for converting a bicarbonate into a carbonate which comprises means for maintaining and confining a circulating stream of inert gas, a heater through which the stream of gas passes, a feeder for introducing wet bicarbonate into the heated gas leaving the heater to be carried along in suspension therein, a second heater beyond the feeder through which the gas and suspended bicarbonate pass and in which they are subjected to a temperature sufficient to decompose the bicarbonate into the carbonate, a separator to which the gas and suspended carbonate pass from the second heater and in which the carbonate is removed from the gas, a connection for conducting the gas from the separator to the first heater, and means between the separator and the first heater for withdrawing a portion of the gas from circulation.

7. In apparatus for converting a bicarbonate into carbonate, the combination of means for maintaining and confining a circulating stream of inert gas, a feeder for introducing the bicarbonate into the stream to be carried along therein in suspension, a heater beyond the feeder in the direction of gas travel, the gas and suspended bicarbonate passing through and being heated in said heater to a temperature sufficient to convert the bicarbonate into the carbonate, a separator beyond the heater in the direction of gas travel and to which the gas and suspended carbonate pass from the heater, the carbonate being removed from the gas in the separator, a conduit for conducting the gas from the separator to said heater, and means between the separator and the feeder for withdrawing a portion of the gas from circulation.

ROBERT B. MacMULLIN.